Patented Mar. 18, 1941

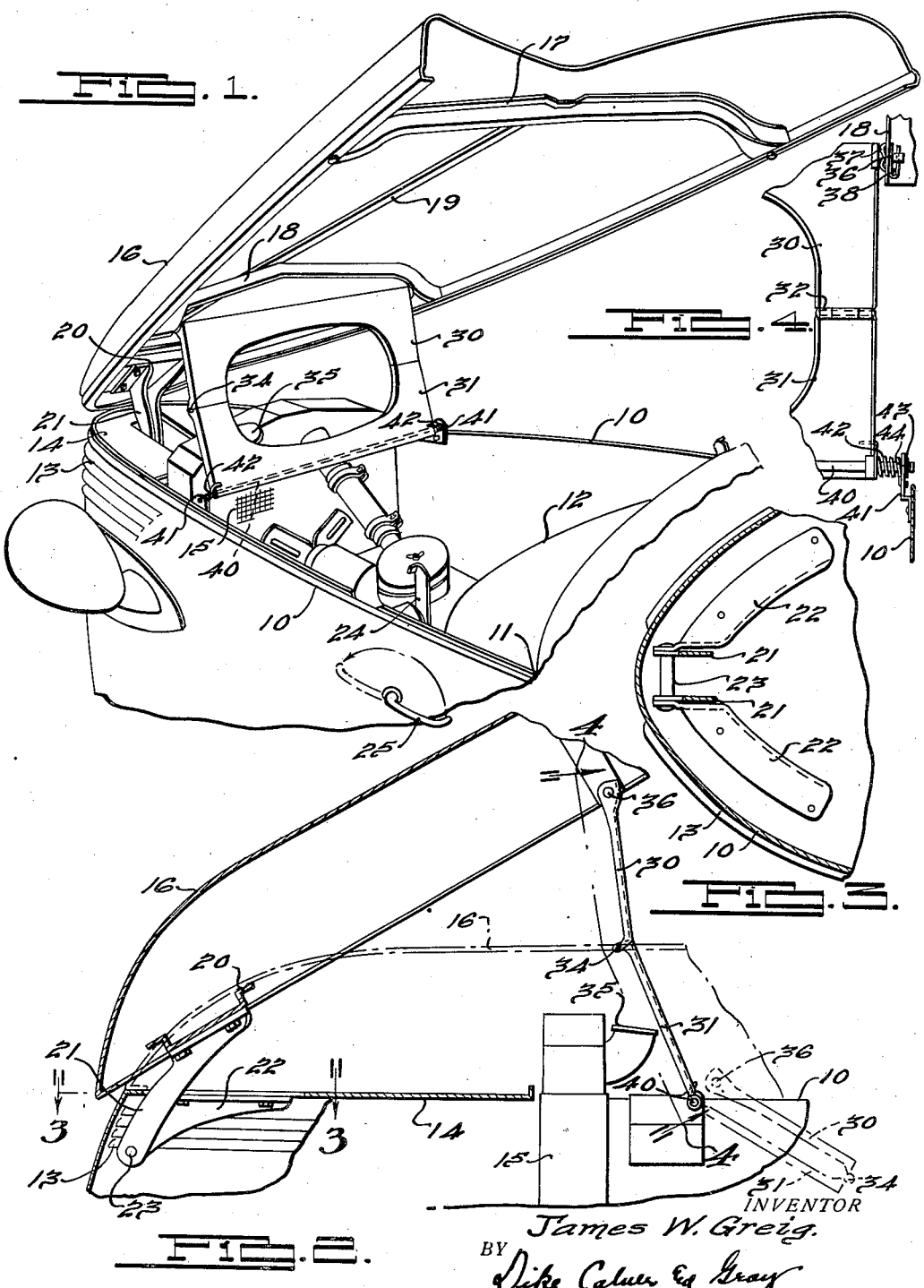

2,235,496

UNITED STATES PATENT OFFICE 2,235,496

MOTOR VEHICLE CONSTRUCTION

James W. Greig, Grosse Pointe Park, Mich., assignor to Hudson Motor Car Company, Detroit, Mich., a corporation of Michigan Application January 15, 1938, Serial No. 185,094

14 Claims. (Cl. 180—69)

The present invention relates to motor vehicle construction and particularly to improvements in the hood or motor bonnet structure.

Prior to the present invention, hood constructions have been proposed in which fixed side panels are secured to the vehicle body and are connected by the radiator shell at the front end of the vehicle. The top or bonnet of the hood in such construction is formed usually as a unitary member connected by hinge connections at its rear edge to the dash or cowl portion of the vehicle body. This construction is frequently referred to as an "alligator" type hood.

In such conventional constructions the top of the hood or bonnet is locked in closed position by means of locking members adjacent the forward end of the bonnet. In one known construction the radiator ornament is employed as the handle of a fastening mechanism which operates to lock or unlock the forward end of the bonnet.

The above described constructions possess inherent features of potential danger as the positioning of the parts is such that the air pressures to which the forward end of the vehicle is subjected when in motion exert a very strong lifting effect on the bonnet. Unless the locking mechanism is properly secured, these air pressures may be built up to such an extent that the lock may be sprung and the bonnet caused to open suddenly. This condition is most frequently encountered during high speed operation of the vehicle. Any unexpected opening of the bonnet would obscure the vision of the operator of the vehicle and might lead to serious consequences before the vehicle could be stopped.

The locking mechanism in such conventional types of constructions is placed at a point remote from the ready line of vision of the operator, so that an unexpected unlocking of the bonnet would not be readily observed by the operator until the bonnet had been thrown suddenly upward as previously described.

In addition to the foregoing difficulties experienced in connection with the above described conventional types of constructions, it has been found that hinging the bonnet to the cowl or dash, as previously described, prevents ready access to the rear portion of the engine for various service operations. It also has been found that conventional methods of securing the side panels to the vehicle body at the rear end and to each other at the forward end through the radiator shell has been unsatisfactory because of breakage of the parts at the points of connection.

A principal object of the present invention is to provide a motor vehicle hood construction in which air pressures built up by the vehicle in motion are utilized to assist in maintaining the hood in a closed position.

A further object of the present invention is to provide a motor vehicle hood construction in which the movable top or bonnet member is pivotally connected to the vehicle in such a manner as to eliminate excessive strains on the bonnet locking mechanism due to forces generated by the air pressures built up on the top or bonnet as a result of the motion of the vehicle.

Another object of the present invention is to provide a motor vehicle hood construction in which the movable top or bonnet member is so constructed and arranged that an unexpected unlocking of the bonnet may be readily observed by the operator of the vehicle.

A further object of the present invention is to provide a motor vehicle hood construction in which a movable support for the top or bonnet is raised to a supporting position upon raising of the bonnet, the said support being readily released and the bonnet closed from either side of the vehicle.

Another object of the present invention is to provide a motor vehicle hood construction in which the movable top or bonnet member is so connected to the vehicle body that the upward swinging of the bonnet relative to the vehicle will permit ready access to all parts of the engine.

A still further object of the present invention is to provide a motor vehicle hood construction in which the top or bonnet supporting member is connected to the side members across the hood structure to provide a cross brace intermediate the connected ends of the side panel members.

Other objects of this invention will appear in the following description and appended claims, reference being had to the accompanying drawing forming a part of this specification wherein like reference characters designate corresponding parts in the several views.

Fig. 1 is a fragmentary view in perspective showing a motor vehicle hood embodying the present invention, the top or bonnet member being shown in the raised position.

Fig. 2 is a fragmentary longitudinal section of the hood construction shown in Fig. 1.

Fig. 3 is a section taken substantially on the line 3—3 of Fig. 2 in the direction of the arrows.

Fig. 4 is a section taken substantially on the line 4—4 of Fig. 2 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The construction shown in the drawing by way of example but not of limitation, may comprise a hood secured to the motor vehicle body, the hood preferably comprising fixed side panels 10, the rear ends of which are secured as at 11 to the cowl portion 12 of the vehicle body structure. The side panels 10 in the present embodiment of the invention comprise the extending arms of a substantially U-shaped member which is provided with a louvered section 13 forming the radiator shell or grille portion of the hood. A rigid plate 14 is secured inside the U-shaped member above the louvered section 13 and performs the double function of reinforcing the forward portion of the structure and of directing the air stream from the louvered section 13 through the core of the radiator 15 which is mounted adjacent the rear edge of said plate.

The top or bonnet 16 is preferably formed of a single sheet of metal and is secured to a framework formed of transverse channel members 17 and 18 and a longitudinal member 19 connected therewith. A cross member 20 is secured to the top or bonnet member 16 adjacent its forward end and one arm 21 of a hinge member is secured thereto and extends downwardly through an opening in the plate 14 adapted to receive it. The other arm or bracket 22 of the hinge member is secured to the plate 14. The arm 21 and the bracket 22 are pivotally connected as at 23, this construction being shown in further detail in Fig. 3. By this construction it will be seen that the raising of the bonnet 16 is accommodated by the pivotal movement of the arms 21 and 22 of the hinge member pivoting about the point 23. Since the hinge is placed adjacent the forward edge of the top or bonnet structure, the bonnet is raised from its rear portion. It will be clear from a consideration of Fig. 2 of the drawing, that by locating the hinge point 23 directly under the upper front edge of the rounded portion of the forward upstanding wall, or lower front edge of the bonnet in the closed position thereof, opening and closing of the bonnet is permitted without interference with the upper front edge of said wall. The hinge point may be arranged slightly forward from the position shown in Fig. 2 without destroying the above effect. Said front upstanding wall is shaped to extend forwardly in order to house the above described hinge means. By virtue of such a construction the hinge means are arranged at the front of the bonnet, and yet they are entirely concealed within the engine compartment and do not appear in front thereof which would be highly objectionable, since appearance of that particular portion of the vehicle is of utmost importance from a commercial standpoint. It will be seen that air pressures built up by the vehicle in motion cannot lift the forward end of the bonnet 16 since the only movement permitted of the forward end is the pivoting movement about the point 23. As the air stream tends to pass over the top portion of the top or bonnet member 16, it will be seen that the tendency of the air pressure is to maintain the top or bonnet in the closed position. Near the rear edge of the bonnet, suitable bonnet fastening means including pivoted locking members 24, which may be controlled by operation of the handle 25, are provided.

In the construction shown in Fig. 1, the locking members 24 are pivoted to brackets secured to opposite sides of the hood side panels. These members are adapted to swing forwardly about transverse horizontal axes to engage the cross member 17 and thus hold the top or bonnet firmly in the closed position. Handles 25 are provided on each side of the hood structure which may be turned to swing the locking members so that the bonnet may be locked or unlocked from either side of the vehicle.

In order to support the hood in the raised position and to provide a reinforcing means for the U-shaped structure forming the side panels and louvered portion of the hood, a supporting stanchion member is provided which consists, in a preferred embodiment, of an upper section 30 and a lower section 31 which are pivotally connected as by hinge members 32 (Fig. 4) having aligned pivots 34 (Figs. 1 and 2). The sections 30 and 31 are each provided with a central opening which provides ready access to the filler cap 35 of the radiator 15. When the members 30 and 31 are in the folded position, as shown in the dotted line view of Fig. 2, the central opening permits the folded members 30 and 31 to overlie various parts of the motor assembly.

The top member 30 is pivotally connected to the cross member 18. As shown in Fig. 4, this connection may comprise an extending stud 36 which is secured on each side of the top edge of the member 30 and extends outwardly therefrom. The member 18 is provided with an opening adjacent each side of the top edge of the member 30 to receive the studs 36. An anti-rattle washer 37 is placed between the member 18 and the edge of the member 30 to prevent rattling in the pivotal connection between the member 18 and the member 30. When the studs 36 are placed in the openings provided in the member 18, a spring cotter pin 38 is inserted at each end. It will be seen that this construction provides a pivotal connection between the member 18 and the top portion of the member 30, which may be readily disconnected by the removal of the cotter pins 38 when necessary to permit a greater opening of the top or bonnet 16.

The member 31 is pivotally mounted at its lower edge on a cross rod 40 mounted in brackets 41 which are secured to the side panels 10 on the opposite sides of the hood structure. As shown in Fig. 4, the brackets 41 are riveted or otherwise securely fastened to the side panels 10 and the ends of the rod 40 extend through the brackets 41. Between the edge of the member 31 and the adjacent face of the bracket 41, a spring 42 is provided. This spring 42 extends around the rod 40 and has one end connected with the member 31 and the other end secured to the bracket 41. When the supporting member is in the closed position, a tension is built up in the spring 42 which assists in raising the supporting member to its open position upon raising the bonnet 16. The spring 42 also acts as an anti-rattle spring preventing rattling at the point of connection between the member 31 and the brackets 41. The spring 42 also is utilized as a check spring to prevent unintentional folding of the members 30 and 31.

The rod 40 extends through a washer 43 and is provided with a spring cotter key 44 which locks it in the assembled position. By this construction it will be seen that the rod 40 acts as a cross rod which ties the side panels 10 together at an intermediate point. This provides a very desirable reinforcement of the hood structure and assists in maintaining the side panels in predetermined position.

When in the raised position, the bonnet 16 is supported by the supporting member in the position shown in Fig. 2, wherein the pivot connections 34 of the hinge members 32 are on a line which extends forward of the line between the centers of the pivoting points provided by the studs 36 and the cross rod 40.

The supporting member is preferably moved to the supporting position by manual operation and folding movement is initiated in the same manner to permit the closing of the top or bonnet portion. This operation may be accomplished from either side of the vehicle. It is to be understood, however, that other types of supporting members may be employed, such for example as check arms or lid supporting devices of various kinds, and that the invention herein is not limited to the particular top supporting member here disclosed.

From the foregoing it will be seen that the described construction provides a motor vehicle hood construction in which air pressures built up by the vehicle in motion are utilized to assist in maintaining the hood in closed position and in which the movable top or bonnet member is pivotally connected to the vehicle in such a manner as to eliminate excessive strains on the bonnet locking mechanism due to the force generated by the air pressures built up on the top or bonnet member by the vehicle in motion.

It will also be observed that since the pivotal connection of the bonnet member to the vehicle is at the forward end of the vehicle and the locking mechanism is adjacent the rear edge of the top or bonnet member, any unexpected unlocking of the top or bonnet will be readily apparent to the operator of the vehicle. It also will be observed that even though the top or bonnet portion should be unexpectedly unlocked and caused to assume the raised position by reason of air pressures within the engine compartment, the vision of the operator of the vehicle would not be cut off entirely but there would still be sufficient vision through the opening between the side panels 10 and the top 16 to stop the vehicle.

It will also be observed that the top or bonnet member may be opened to the raised position or closed to the lowered position from either side of the vehicle and that when the bonnet is in the raised position, as shown in Fig. 1, ready access may be had to all parts of the engine requiring service operations.

It also will be observed that cross members are provided between the side panels of the hood structure in such a manner as to assist in making the entire structure more rigid.

I claim:

1. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, and locking means adjacent the sides of said bonnet and rearward of said hinge connection for locking said bonnet at opposed sides and adjacent said fixed side panels.

2. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, locking means adjacent the sides of said bonnet and rearward of said hinge connection for locking said bonnet at opposed sides and adjacent said fixed side panels, and bonnet supporting means movable upon raising said bonnet to maintain the bonnet in raised position.

3. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, locking means adjacent the sides of said bonnet and rearward of said hinge connection for locking the opposite sides of said bonnet in closed position to the side panels, and bonnet supporting means movable upon raising said bonnet to maintain the bonnet in raised position and comprising a pair of hinged stanchion members pivotally secured, one to opposite sides of said side panels and one to opposite sides of said bonnet, said stanchion members being foldable to permit closing of said bonnet and extensible on raising said bonnet to support said bonnet in raised position.

4. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, locking means adjacent the sides of said bonnet and rearward of said hinge connection for locking said bonnet at opposed sides and adjacent said fixed side panels, and a cross brace member extending transversely of the hood and secured to said side panels intermediate the ends thereof.

5. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, locking means adjacent the sides of said bonnet and rearward of said hinge connection for locking said bonnet at opposed sides and adjacent said fixed side panels, bonnet supporting means movable upon raising said bonnet to maintain the bonnet in raised position, and a cross brace member extending transversely of the hood and secured to said side panels intermediate the ends thereof.

6. A hood for a motor vehicle having fixed side panels and a movable top bonnet comprising a unitary member shaped to form the top contour of the hood and movable as a unit relative to the vehicle, a hinge connection between the forward end of said bonnet and the forward end of the vehicle, locking means adjacent the sides of said bonnet and rearward of said hinge connection for locking the opposite sides of said bonnet in closed position to the side panels, bonnet supporting means movable upon raising said bonnet to maintain the bonnet in raised position and comprising a pair of hinged stanchion members pivotally secured, one to opposite sides of said side panels and one to opposite sides of said bonnet, said stanchion members being foldable to permit closing of said bonnet and extensible on raising said hood to support said bonnet in raised position, and a cross brace member extending transversely of the hood and secured to said side panels intermediate the ends thereof.

7. A hood for a motor vehicle comprising a substantially U-shaped member secured to the vehicle body to provide fixed side panel members and a radiator grille section, a unitary top member pivotally secured thereto at its forward end at a point adjacent the grille section of said substantially U-shaped member, a cross brace member extending transversely of said substantially U-shaped member and secured to the fixed side panel members at points intermediate the ends thereof, and a supporting member including two hinged parts, one of said parts being hingedly connected to said cross brace member and the other part being hingedly connected to said unitary top member for supporting the latter in raised position.

8. A hood for a motor vehicle comprising a substantially U-shaped member secured to the vehicle body to provide fixed side panel members and a radiator grille section, a unitary top member pivotally secured thereto at its forward end at a point adjacent the grille section of said substantially U-shaped member, a cross brace member extending transversely of said substantially U-shaped member and secured to the fixed side panel members at points intermediate the ends thereof, locking means for maintaining the top member in closed position relative to said fixed side panels, and supporting members adapted to support the top member when in an open position, one of said supporting members being pivotally connected to said cross brace member.

9. A hood for a motor vehicle comprising a substantially U-shaped member secured to the vehicle body to provide fixed side panel members and a radiator grille section, a unitary top member pivotally secured thereto at its forward end at a point adjacent the grille section of said substantially U-shaped member, a cross brace member extending transversely of said substantially U-shaped member and secured to the fixed side panel members at points intermediate the ends thereof, and a collapsible and extensible supporting member pivotally mounted on said cross brace member and adapted to support the top member when in an extended position.

10. In a motor vehicle having an engine, a hood for covering said engine, said hood comprising vertically extending fixed walls enclosing said engine at the front and sides and forming an opening at the top, a bonnet substantially coextensive with said opening and adapted to close the same, hinge means provided adjacent the front end of said bonnet for hingedly securing the same to said walls to close and to open said compartment selectively, said hinge means having a stationary hinge point within the space defined by said walls and underneath the lower front edge of said bonnet.

11. In a motor vehicle having an engine, a hood for covering said engine, said hood comprising vertically extending fixed walls enclosing said engine at the front and sides and forming an opening at the top, a bonnet substantially coextensive with said opening and adapted to close the same, a hinge arm secured to said bonnet intermediate its ends and adjacent to the front end thereof, said arm extending downwardly and forwardly from said bonnet and having the hinge point at its further extremity, said point being located directly underneath the lower front edge of said bonnet, and a member secured to said fixed walls and adapted to provide a foundation for said hinge point.

12. In a motor vehicle having an engine, a hood for covering said engine, said hood comprising vertically extending fixed walls covering said engine from the front and sides and forming an opening at the top, a bonnet substantially coextensive with said opening and adapted to close the same, a hinge arm secured to said bonnet intermediate its ends and adjacent to the front end thereof, a plate secured to said fixed walls at the front thereof, a downwardly extending bracket secured to said plate, said arm extending downwardly and forwardly of the bonnet and further forward than the front edge of said bonnet hingedly secured to said bracket, said vertically extending walls being shaped to house said hinge arm within their confines.

13. In a motor vehicle having an engine, a hood covering said engine and comprising a substantially U-shaped member fixedly mounted on the vehicle body and providing fixed upstanding walls extending around substantially three sides of said engine and forming an opening at the top, a unitary top member having its forward end pivotally secured to said U-shaped member at a point adjacent the upper edge of the curved forward wall of said U-shaped member and for a substantial distance below said edge, said top member cooperating with said U-shaped member to form an engine compartment which can be opened and closed selectively by raising and lowering said top member.

14. In a motor vehicle having an engine and a radiator, a compartment in part housing said engine and radiator, said compartment being open at its top, a bonnet substantially coextensive with said opening and adapted to close the same, hinge means provided substantially adjacent the front end of said bonnet for hingedly securing the same to close and to open said compartment selectively, said hinge means having a stationary hinge point within said compartment and below the lower front edge of said bonnet and the top of said radiator.

JAMES W. GREIG.